United States Patent Office 2,693,488
Patented Nov. 2, 1954

2,693,488

PURIFICATION OF AMINO ALKANE SULFONIC ACIDS BY ION EXCHANGE

Arthur R. Sexton, Midland, Mich., assignor to The Dow Chemical Company, Midland, Mich., a corporation of Delaware No Drawing. Application August 30, 1950, Serial No. 182,405

7 Claims. (Cl. 260—513)

This invention relates to the production of aminoalkanesulfonic acids, and, more particularly, to the conversion of metallic salts of aminoalkane sulfonic acids to the corresponding acids, and the separation of the latter from other acids.

Aminoalkanesulfonic acids (e. g. taurine:

$$H_2NC_2H_4SO_3H)$$

occur in nature, and their metallic salts have heretofore been synthesized (cf. Schick and Degering: Ind. Eng. Chem., 39, 906 (1947)). I prefer to produce such salts by a method that involves the reaction of ammonium hydroxide or an aqueous solution of an alkyl amine with a metallic salt of the corresponding hydroxyalkanesulfonic acid (e. g., isethionic acid: $HOC_2H_4SO_3H$). The products resulting from such a synthesis, however, include, in addition to the desired salt of the aminoalkanesulfonic acid, unreacted hydroxyalkanesulfonic acid salt starting material, and other impurities. So far as is known, it was believed to be impossible, prior to my invention, to separate pure aminoalkanesulfonic acid from such impurities.

The present invention is based upon the discovery that certain aminoalkanesulfonic acids can be recovered in pure form from contaminants of the type which result from the synthesis described in the preceding paragraph.

According to the invention, a pure aminoalkanesulfonic acid having the generic formula

is produced by a method that comprises (1) contacting an aqueous solution of a metallic salt of the crude acid with a water-insoluble cation exchange resin in its hydrogen form, (2) contacting the effluent solution from the cation exchange resin with a water-insoluble anion exchange resin in its basic form, and (3) recovering the acid thus purified from the resulting solution. In the generic formula for the aminoalkanesulfonic acid produced, the symbols a and a' represent hydrogen or alkyl radicals having not more than four carbon atoms, and R is a saturated bivalent acyclic hydrocarbon radical having not more than three carbon atoms.

Aminoalkanesulfonic acids identified by the formula

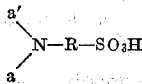

are amino-, methane-, ethane-, or propane-, sulfonic acids; the nitrogen of the amino group is unsubstituted or is substituted by not more than two alkyl groups, each of which contains not more than four carbon atoms. The amino group and the —SO₃H group can be attached to the same carbon atom or to different carbon atoms. Most desirably, the aminoalkanesulfonic acid produced in pure form is taurine, methyltaurine or a methylaminopropanesulfonic acid (see Example 1). The hydroxylalkanesulfonic acids from which the amino compounds are synthesized, as described above, are hydroxymethanesulfonic acid, hydroxyethanesulfonic acids, or hydroxypropanesulfonic acids.

When a hydroxyalkanesulfonic acid salt is reacted with ammonium hydroxide or an aqueous solution of an alkylamine to produce the corresponding aminoalkanesulfonic acid salt, substantial amounts of the unreacted hydroxyalkanesulfonic acid salt remain in the reaction products; the other principal contaminant is usually a sulfuric acid salt. Accordingly, pure aminoalkanesulfonic acids were not produced prior to my discovery because the separation could not be effected.

In general, in producing a pure aminoalkanesulfonic acid according to the invention any cation exchange resin and any anion exchange resin can be used. It is preferred that the anion resin be one having weakly basic characteristics, e. g., a resin that possesses basic properties because of the presence of primary, secondary or tertiary amine groups, as distinguished from quaternary ammonium salts.

The recovery of a pure aminoalkanesulfonic acid by my process is a three step method. The first step involves passing an aqueous solution containing a metallic salt of the aminoalkanesulfonic acid (preferably an alkali metal salt) and impurities over a cation exchange resin in its hydrogen form; salts in the solution being purified are converted to free acids by this step. The effluent solution is then passed over an anion exchange resin in its basic form as the second step of the process. It has been found that at least a major portion of the aminoalkanesulfonic acids present remain in solution, while hydroxyalkanesulfonic acids, sulfuric acid, and other acidic impurities that are ordinarily present can be selectively retained on the anion exchange resin at this point in the process. It is usually preferred, in carrying out step two, to pass effluent solution from step one over the resin until one of the impurities (usually the hydroxyalkanesulfonic acid) appears in the solution flowing from the anion exchange resin. It is possible to stop the flow of solution over the resin before an impurity appears in the product, but more frequent regeneration of the resin is then necessary. The third step of the process involves recovery of the aminoalkanesulfonic acid from the remaining solution that has been freed of impurities by its contact with the anion exchange resin. This recovery may be effected in any convenient way, e. g., by evaporating the water in which the pure product is dissolved.

When the cation exchange resin is expended it is readily converted to its hydrogen form by passing an aqueous acid over it, and then washing with water in the usual way. When it is desired to regenerate the anion exchange resin it is found that some aminoalkanesulfonic acid is usually retained by the resin. This is conveniently released: (a) if the resin is weakly basic, by a water wash, or (b) if the resin is strongly basic, by washing with an alkaline solution. The weakly basic resins release an aqueous solution of the pure aminoalkanesulfonic acid when washed with water, whereas the strongly basic resins release impurities along with the aminoalkanesulfonic acid, so that the wash solution must be recycled to obtain the maximum yield of the aminoalkanesulfonic acid. Weakly basic anion exchange resins are, therefore, preferred.

The expended anion exchange resin (after the retained aminoalkanesulfonic acid has been separated therefrom) is regenerated. A strongly basic exchange resin is regenerated to its hydroxyl form only by a strong base, e. g., alkali metal hydroxides, quaternary ammonium hydroxide, and the like; it is regenerated to the salt of a weak volatile acid by treatment, e. g., with alkali metal carbonates, bicarbonates, sulfites, bisulfites, sulfides, and the like. A strongly basic anion exchange resin is in its basic form for purposes of the invention when it is regenerated by any of the above compounds, or their equivalents. A weakly basic anion exchange resin is regenerated to its hydroxide form by an excess of most of the above compounds, or by ammonium hydroxide or other similar weak bases. Alkali metal bisulfites convert even the weakly basic exchange resins only to the bisulfite form.

It is usually preferred that the aqueous solution comprising the aminoalkanesulfonic acid to be purified according to the invention contain not more than about ten per cent of dissolved electrolyte; higher concentrations are operable, but have a deleterious effect on the resin. Most desirably the solution contains from about five to about ten per cent of electrolyte. (The terms "per cent" and "parts" are used herein to refer to per cent and parts by weight, unless otherwise indicated.) Both ion exchanges are conveniently effected at a temperature between about 20° C. and about 40° C.

Although a preferred embodiment of the invention, namely, the recovery of a pure aminoalkanesulfonic acid from a solution of metallic salts has been described, it is to be understood that my method is equally applicable to the separation of the pure aminoalkaneuslfonic acid from a solution comprising that acid and acidic contaminants. Cation exchange treatment is not required in such case; it is sufficient that the solution is passed over the anion exchange resin, and the aminoalkanesulfonic acid recovered from the effluent solution.

The following examples illustrate preferred embodiments, but are not to be construed as limiting the invention:

EXAMPLE 1

A. The preparation of a hydroxyalkanesulfonic acid starting material.

Aqueous sodium bisulfite (about one pound mol of approximately a 30 per cent solution) was placed in a closed vessel and maintained at 50° C.; propylene oxide was pumped into the liquid until all the sodium bisulfite was consumed. The resulting product was an aqueous solution of the sodium salt of a hydroxy propanesulfonic acid.

B. The production of an aminoalkanesulfonic acid from a hydroxyalkanesulfonic acid.

An autoclave was charged with 1500 grams of 27 per cent aqueous ammonium hydroxide and two gram mols of approximately a 35 per cent aqueous solution of the sodium salt of a hydroxy propanesulfonic acid produced as described in the preceding paragraph. The autoclave was closed, and the charge heated at 250° C. for eight hours; the autoclave was then cooled and drained, and the liquid therefrom was heated to distill excess ammonia.

C. Purification of the aminopropanesulfonic acid produced in step B.

The aminopropanesulfonic acid sodium salt solution produced according to procedure B was passed through 2.8 gram mols of Dowex–50 cation exchange resin in the hydrogen form; the effluent solution was then passed through 2.0 gram mols of Amberlite IR4B anion exchange resin in its basic form. ("Dowex–50" is a sulfonated styrene divinylbenzene cation exchange resin of the type described in U. S. Patent 2,366,007; Amberlite IR4B is an amino-type anion exchange resin whose properties are fully described by Kunin and Myers, J. Am. Chem. Soc. 69, 2874 (1947). One mol of an ion exchange resin, as the term is used herein, is the amount thereof that absorbs one equivalent of an acid or a base.) The effluent solution from the anion exchange resin was then heated to dryness; the dried residue (87 grams) was found to be a propanesulfonic acid (31.25 per cent yield).

EXAMPLE 2

An autoclave was charged with 2100 grams of a 27 per cent aqueous solution of methyl amine and 2 gram mols of approximately a 35 per cent aqueous solution of a sodium salt of a hydroxy propanesulfonic acid produced as described in procedure B of Example 1. The autoclave was closed, and the charge heated at 250° C. for 8 hours; the autoclave was then cooled and drained, and the liquid therefrom was heated to distill excess methylamine. The methylaminopropanesulfonic acid salt so produced was purified by passage through 2.8 gram mols of Dowex–50 resin and 2.0 gram mols of Amberlite IR4B, as described in procedure C of Example 1. The effluent solution was then heated to dryness; the dried residue (193 grams) was found to be a methylaminopropanesulfonic acid (63 per cent yield).

EXAMPLE 3

The applicability of the process of the invention to the recovery of other pure aminoalkanesulfonic acids was demonstrated by further test work. The results of this work are presented in the table below. The experiments referred to in the table were carried out using a procedure similar to that described in Example 1, part C.

Table

| Expt. No. | Test Solution | Cation Exchange Resin | Anion Exchange Resin | Product Recovered | Percent Yield of Product |
|---|---|---|---|---|---|
| 1 | 1,000 gms. solution: 30.6 gms. taurine and 12.4 gms. isethionic acid. | | 0.19 gram mol Amberlite IR4B resin. | 30.4 grams taurine | 99.4 |
| 2 | 2,890 gms. solution: 116 gms. of n-methyl taurine. | | 3.36 gram mols of Amberlite IR4B resin. | 112 grams n-methyl taurine. | 97 |
| 3 | 3,126 gms. solution: 125 gms. of n-methyl taurine and 16.7 gms. isethionic acid. | | 0.132 gram mol Dowex-2*. | do | 90 |
| 4 | Product of reaction between 2 mols of sodium isethionate and 12 mols of dimethylamine (Procedure of Ex. 1, Part B). | 2.8 gram mols of Dowex-50 | 2.0 gram mols Amberlite IR4B resin. | 290 grams n,n'-dimethyl taurine. | 95 |
| 5 | Product of reaction between 1.5 mols of sodium isethionate and 9 mols of diethylamine (Procedure of Ex. 1, Part B). | do | do | 151 grams n,n'-diethyl taurine. | 55.6 |

*Dowex-2 is a solid styrene-divinylbenzene ion exchange resin which derives its basic properties from quaternary ammonium groups.

I claim:

1. A method of producing a pure aminoalkanesulfonic acid having the generic formula

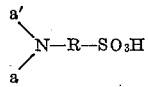

in which each of the symbols a and a' represents a member of the group consisting of hydrogen and alkyl radicals having not more than four carbon atoms, and R is a saturated bivalent acyclic hydrocarbon radical having not more than three carbon atoms, from a water solution consisting essentially of metallic salts of the aminosulfonic acid, sulfuric acid, and of an acid having the generic formula

in which R has the meaning above stated, that comprises (1) contacting the water solution with a water-insoluble cation exchange resin in its hydrogen form, (2) contacting the effluent solution from the cation exchange resin with a water-insoluble anion exchange resin in its basic form, and (3) recovering the aminoalkanesulfonic acid thus purified from the resulting solution.

2. A method of producing a pure N-lower alkyl taurine from a water solution comprising essentially of the alkali metal salts of the N-lower alkyl taurine and of isethionic acid that comprises (1) contacting the water solution with a water-insoluble cation exchange resin in its acid form, (2) contacting the effluent solution from the cation-exchange resin with a water-insoluble anion exchange resin in its basic form and (3) recovering the N-lower alkyl taurine thus purified from the resulting solution.

3. A method of producing pure taurine from a water solution consisting essentially of alkali metal salts of taurine, sulfuric acid, and isethionic acid that comprises (1) contacting the water solution with a water-insoluble cation exchange resin in its hydrogen form, (2) contacting the effluent solution from the cation exchange resin with a water-insoluble anion exchange resin in its basic form, and (3) recovering the taurine thus purified from the resulting solution.

4. A method of producing pure methyl taurine from a water solution consisting essentially of alkali metal salts of methyl taurine, sulfuric acid, and isethionic acid that comprises (1) contacting the water solution with a water-insoluble cation exchange resin in its hydrogen form, (2) contacting the effluent solution from the cation exchange resin with a water-insoluble anion exchange resin in its basic form, and (3) recovering the methyl taurine thus purified from the resulting solution.

5. A method of producing a pure methylaminopropanesulfonic acid from a water solution consisting essentially of alkali metal salts of the methylaminopropanesulfonic acid, sulfuric acid, and of an hydroxy propanesulfonic acid that comprises (1) contacting the water solution with a water-insoluble cation exchange resin in its hydrogen form, (2) contacting the effluent solution from the cation exchange resin with a water-insoluble anion exchange resin in its basic form, and (3) recovering the methylaminopropanesulfonic acid thus purified from the resulting solution.

6. A method of producing pure taurine from a water solution consisting essentially of an alkali metal salt of taurine, sulfuric acid, and isethionic acid that comprises (1) passing the water solution through a bed of a water-insoluble cation exchange resin in its hydrogen form, (2) passing the effluent solution from the cation exchange resin through a bed of a water-insoluble, weakly basic anion exchange resin in its basic form until isethionic acid appears in the product leaving the bed, (3) washing the anion exchange resin with water, and (4) recovering taurine from the combined effluent solutions from the anion exchange bed.

7. A method of producing pure methyl taurine from a water solution consisting essentially of alkali metal salts of methyl taurine, sulfuric acid, and isethionic acid that comprises (1) passing the water solution through a bed of a water-insoluble cation exchange resin in its hydrogen form, (2) passing the effluent solution from the cation exchange resin through a bed of a water-insoluble, weakly basic anion exchange resin in its basic form until isethionic acid appears in the product leaving the bed, (3) washing the anion exchange resin with water, and (4) recovering methyl taurine from the combined effluent solutions from the anion exchange bed.

References Cited in the file of this patent

UNITED STATES PATENTS

| Number | Name | Date |
|---|---|---|
| 1,999,614 | Nicodemus et al. | Apr. 30, 1935 |
| 2,341,907 | Cheetham et al. | Feb. 15, 1944 |
| 2,387,824 | Block | Oct. 30, 1945 |
| 2,415,558 | Hesler et al. | Feb. 11, 1947 |
| 2,462,597 | Block | Feb. 22, 1949 |
| 2,510,980 | Jacobs et al. | June 13, 1950 |